United States Patent [19]

Janosch et al.

[11] Patent Number: 5,521,976
[45] Date of Patent: May 28, 1996

[54] MODULAR SUBSCRIBER DEVICE

[75] Inventors: Joachim Janosch, Bamberg; Konrad Eibenberger, Nuremberg, both of Germany

[73] Assignee: Grundig E.M.V., Furth/Bay, Germany

[21] Appl. No.: 256,849

[22] PCT Filed: Nov. 24, 1993

[86] PCT No.: PCT/EP93/03293
§ 371 Date: Sep. 14, 1994
§ 102(e) Date: Sep. 14, 1994

[87] PCT Pub. No.: WO94/13087
PCT Pub. Date: Jun. 9, 1994

[30] Foreign Application Priority Data

Nov. 26, 1992 [DE] Germany .................. 42 39 656.5

[51] Int. Cl.⁶ .................................................. H04M 1/00
[52] U.S. Cl. .......................... 379/397; 379/399; 439/638
[58] Field of Search .................................... 379/397, 399; 439/638, 76

[56] References Cited

U.S. PATENT DOCUMENTS 5,349,640  9/1994  Dunn et al. ...................... 379/399
5,423,697  6/1995  MacGregor ....................... 439/638

FOREIGN PATENT DOCUMENTS

437396A1  1/1991  European Pat. Off. .
0349079   1/1990  Japan ............................. 379/399

Primary Examiner—Jeffery Hofsass
Assistant Examiner—Jacques M. Saint-Surin
Attorney, Agent, or Firm—Kane, Dalsimer, Sullivan, Kurucz, Levy, Eisele & Richard

[57] ABSTRACT

The device is a subscriber apparatus with one or more modules interconnected by a bi-directional bus which communicates both digital and analog signals. The module perform different telecommunication functions, such as telephone, telefax, etc. Each module includes storage with a module-specific control program. The control unit may control the whole subscriber apparatus. When a new module is connected to the bus, an identification is assigned thereto which further determines the start address for the module-specific control program.

4 Claims, 2 Drawing Sheets

MODULAR SUBSCRIBER DEVICE

BACKGROUND OF THE INVENTION

1. Field of the Invention

The invention pertains to a subscriber apparatus with one or more modules interconnected by a bi-directional bus with conveys both digital and analog signals. The modules perform different telecommunication functions, such as telephone, facsimile and others.

2. Description of the Prior Art

EP-A2-0 363 956 discloses a data input and data processing device which can be connected to a telephone. Thus, the data input and data processing device provides the capability to input different data and to store the same, for example, names, addresses and telephone numbers. The telephone has the known functions of establishing a connection, relaying a telephonic communication and triggering a connection in a PSTN. When the data input and data processing device is connected with the telephone, this combination enables a simpler and more comfortable handling of the telephone.

Such a combination can simplify the use of the telephone, but it does not offer any access to other telecommunication services such as telefax or facsimile transmission. Furthermore, such an arrangement is not very user-friendly, since conventional operating elements of the telephone, for example, the dial or the keys can no longer be used.

EP-A2-0-141289 discloses the main components of a subscriber station connected with each other by a bi-directional bus.

In the aforementioned subscriber station, it is disadvantageous that only some main components can be connected to the bus by a special interface. Furthermore, it is disadvantageous that only one single selection control computer controls all components connected with the bus, whereby either considerable processing times are generated in the subscriber location, or that a relative expense is required for the selection control computer.

DE-A1-40 08 667 discloses the connection of a computer on the internal bus and to a pair of conductors for transmitting the user-channel-information of a digital telecommunication transmission device. In this case the computer is in form of a module and is inserted into the telecommunication transmission device.

The disadvantage of this device combination is that the telecommunication final device must be suitable for the integrated services digital network (ISDN). An analog telecommunication transmission device cannot switched together with such a computer, since it does not generate or process digital signals. EP-B1-0092 084 discloses a telecommunication device with an integrated electronic text transmitter for transmitting and/or receiving text data. There, the total device consists of a base device and one or a plurality of functional modules which are being connected with the base device by plug-in components. The base device provides, among others, telephone circuitry, at least a part of the control device and a part of the text data storage. Additional storage means and additional control devices are provided in the functional modules. A disadvantage of this telephone device with the integrated electronic text transmitter is that a plurality of function modules are required to enable only one single additional function, namely the answering unit. Furthermore, it is also disadvantageous that only a limited number of additional modules can be connected with the base device.

DE-B1-28 54 516 discloses a telephone with an integrated answering unit. For storing the voice signal, two different memories are being used, a digital memory and a magnetic tape memory on which the analog voice signal is stored. This telephone device with the integrated answering unit is disadvantageous that no more than two additional structural groups and no structural groups with a different function can be connected to the telephone.

OBJECTS AND SUMMARY OF THE INVENTION

It is an object of the invention to design a subscriber station so that additional modules can be connected at a later time to the bus and that the same can be automatically brought into an operative condition.

This object is solved in that each individual module of the subscriber device enables a defined group of functions (for example, telefax-functions or functions for fax transmission). The modules are interconnected through a bus which enables the transmission of digital and analog signals. Thereby, the bus and the protocol used for transmission are such that a later expansion with novel function groups is made possible. Each module of the telephone device is provided with a memory which contains a module specific control program and whose initial address is determined by the identification of the module. In order to assure an orderly operation of the subscriber device, the control unit of the active module always receives the control over the common bus.

DE-A1-40 08 968 (assigned to the instant assignee) discloses a control device for automatic switching over to a different type of communication in subscriber devices composed of a plurality of end devices. Thereby, with an incoming call the type of communication of the information received is determined by the control device.

Thereafter, if need be, the main connecting line is switched by means of a switch over line to the end device which corresponds to the type of communication. Subsequently the control device generates a call signal for the selected end device. The control device for automatic switching over of the type of communication known from DE-A1-40 08 968 is used in the inventive subscriber device for the automatic selection of the module to be activated during an in-coming call.

The subscriber device in accordance with the subject invention is advantageous in that all function groups are realized by a separate module, so that a stepwise extension and a simple exchangeability is made possible when servicing the device. In view of the fact that voice and data are available in the bus, the exchange of all relevant signals is possible through a connection of a module with the bus. Furthermore, the modules have the advantage of an inherited control unit, so that later developed, particularly highly efficient modules increase the efficiency of the total subscriber unit. In view of the fact that only always the control unit of the active modules has the control over the common bus, there is no possibility for a simultaneous access of a plurality of control units. This enables to provide simple modules equipped with less complex control units. In view of the plurality use of indication and service elements it is made possible to obtain considerable savings in these relative cost intensive function groups. Since each module has its own memory for its own storage program, subsequent additions for the subscriber unit are made possible. Furthermore, the identification signal associated with each module contains the initial address of the module specific control program, so that the control unit of a module can call up all control programs of the subscriber unit in an orderly manner.

The embodiment of the subscriber unit including plug devices is advantageous in that individually modules are immediately adjacent to each other which saves considerable space, and that they can be mounted at any other location connected by a cable.

The embodiment of the subscriber unit which includes an identification assigned to each module by the activated control device during its operation on the bus is advantageous in that an identification will be assigned automatically to each module when put in operation, so that it can be selected without any doubts. Therefore, a module may be separated from a bus without any problems and can be connected with the bus of another subscriber unit. When put into operation on the other subscriber unit, this module is then automatically assigned a new identification, so that no simultaneously interfering data can occur in the bus.

The subscriber unit which includes a data exchange of all modules being connected by a common bus, the control unit of a newly activated second module by the user at first transmits its own identification through a control signal line of bus is advantageous in that subsequently developed modules can be connected to the subscriber unit. Furthermore, it enables a universal transmission protocol to the column bus so that different modules can be connected. It is also possible to carry out internal module actions without accessing the bus.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 1:
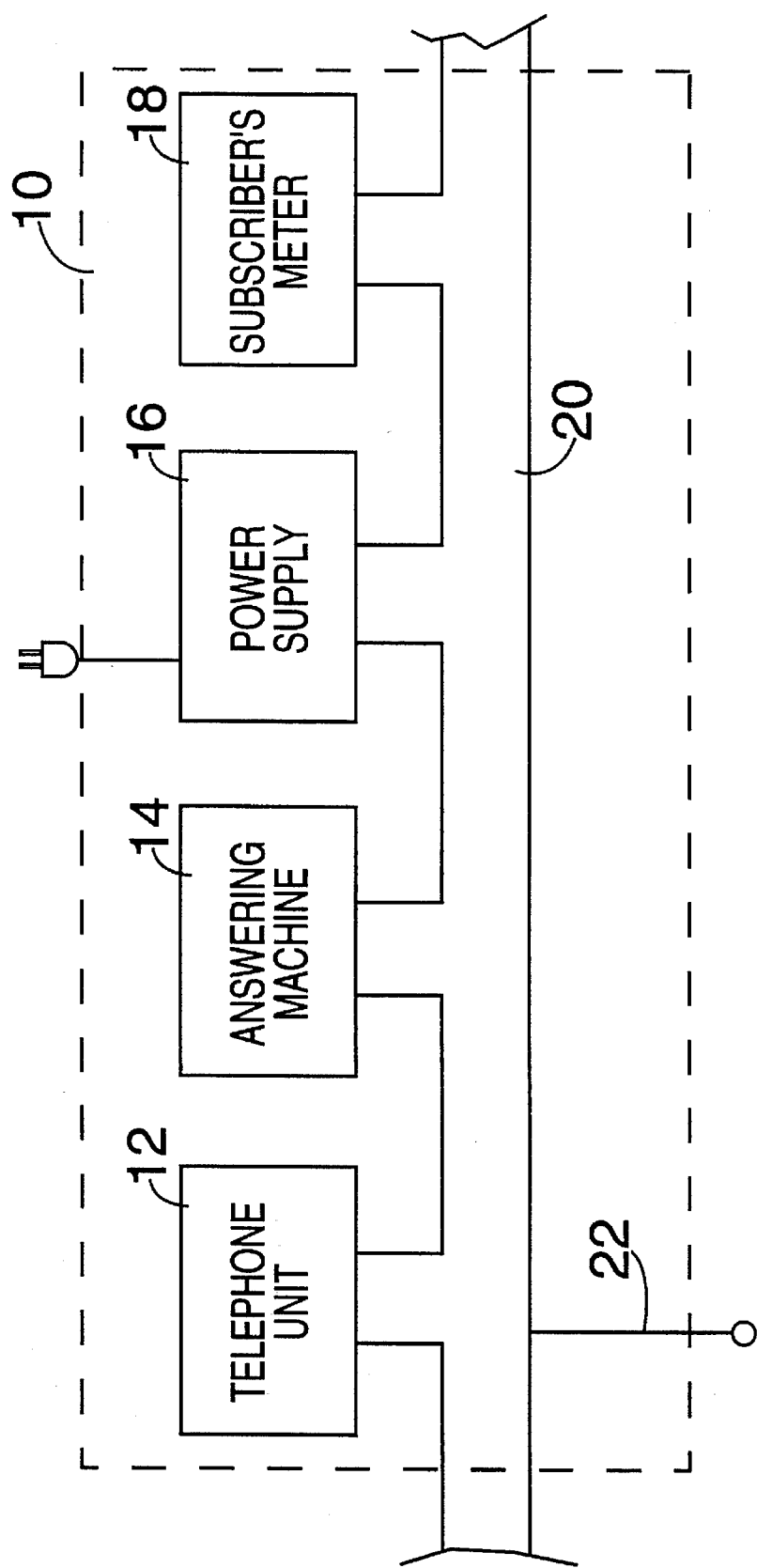
FIG. 1 is a block diagram of the subscriber unit of the present invention.

FIG. 1 shows the interswitching of a plurality of modules 12, 14, 16, 18 through a bus 20. The telephone unit 12 is connected through the bus 20 with a telecommunication network and with other modules of the subscriber device 10. This includes an answering machine 14, a power supply 16 which is connected with the AC power supply for energy supply and a subscriber's meter 18. Digital data as well as analog voice signals are exchanged through the common bus 20. Thus, analog as well as digital configurations of the modules can be connected through bus 20.

Additionally, bus 20 supplies voltage from the power supply 16 which is connected to the alternate voltage supply. The telephone unit 12 contains a conventional telephone which is connected with the telecommunication network through the main connection line 22 and through bus 20 to the module. Since the telephone unit 12 represents a basic component of the subscriber's unit, which is mostly present (eventually in form of a cordless telephone), this module may also contain a central service and indication module. Thus the operation of a plurality of modules can be centrally controlled. The clear arrangement of the operating elements precludes the user from over extending during the operation of the device. Moreover, module specific functions can be triggered on the module itself by corresponding operating elements.

If an incoming call is signalled on the main line 22, the active control unit of the subscriber's unit first establishes the type of communication of the received information and a switching over, if need be, is then made to the corresponding module. For such automatic activation of a module the identification signal K is fed from a first module to a second module and to the control signal line of the common bus 20. As soon as the second module recognizes its identification K, it again feeds its own identification K again to the control line. Thereafter, the second module receives the information. If, by way of example, an incoming call is recognized by the control unit of another module, this control unit then feeds the identification to the telephone module 12. The same is recognized by the telephone module 12, is then also fed and signalled to the user. The user now has the possibility to lift the receiver from the telephone module 12 (so as to actuate the cradle switch). Thus this module is activated. The control unit of the telephone module 12 takes charge of the control for the control bus 20. The call can now be answered. If the cradle switch of the telephone unit 12 is not actuated, then the answering machine 14 switches on, for example, if the same had been in the operating mode. The operation and indication of operating conditions of the answering machine 14 can be made through the central operating and indicator unit which is integrated in the telephone module 12. The answering machine 14 itself (tape operated and/or electrical circuits) can be placed at a removed location from the telephone module 12.

If a connection should be established from the subscriber's unit through the telecommunication network, then the user actuates in customary manner the cradle switch of the telephone module 12. Thus this module is activated. Thereafter, it is possible to feed the desired number individually through the integrated operating unit of the telephone module 12 or to activate this module by a module which is targeted for the desired number (not shown) by pressing a key thus calling the desired number. If a targeted selection was made, the target selection module inactivates after the call is made and the telephone module again controls the common bus 20. It is possible to have the selected number indicated by the indicator unit. If the target selection module makes available further information to this number (name, address, remarks, etc.), the same may also be indicated by file indicator unit. During the indication of the data associated with the called number, the user may conduct the telephone conversation or he may carry out a data long distance transmission over the telecommunication network by means of a modem (not shown) which is also connected on bus 20 and a data processing installation. In order to activate the modem an operating element must be actuated which is mounted on the operating unit or on the modem. If the operating and indicator elements of the modem are integrated in the operating and indicator module, then the modem, connected through a cable with the subscriber's unit 10, and may also be realized in an integrated manner in a data processing unit. The operation of the data processing unit which is connected to the modem is well-known in the prior art and is not discussed herein. When making a call a subscriber's meter 18, which is also connected as a module on bus 20, can be activated so that the required charge units or the already generated expenses can be indicated on the indicator unit.

Figure 2:
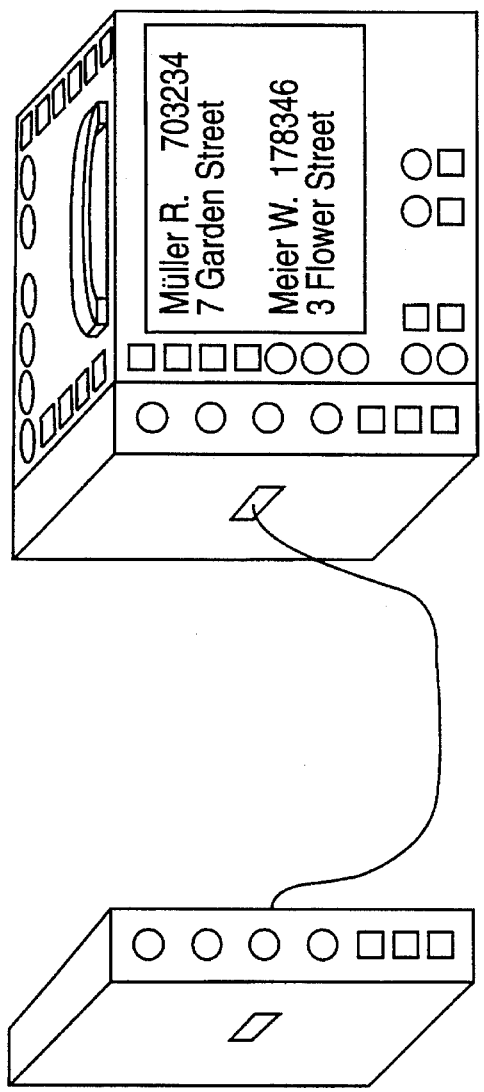
FIG. 2 is a view of the subscriber unit in accordance with the invention.

FIG. 2 shows a possibility to install the modular subscriber's device. Naturally, all modules with the operating elements within reach of the user. However, this does not mean that all of them have to be placed at the same location. They may be connected by a cable in communication with the bus 20. At least the modules with the indicating means must be located at a visual range. All other modules which do not have any operating or indicating means may be placed farther removed for saving space, for example. Preferably, the modules have substantially identical outer measurements, in order to present a flush, aesthetic appearance. Each module is provided with at least two connection possibilities for the common bus 20, through which it is connected with the other modules.

Figure 3:
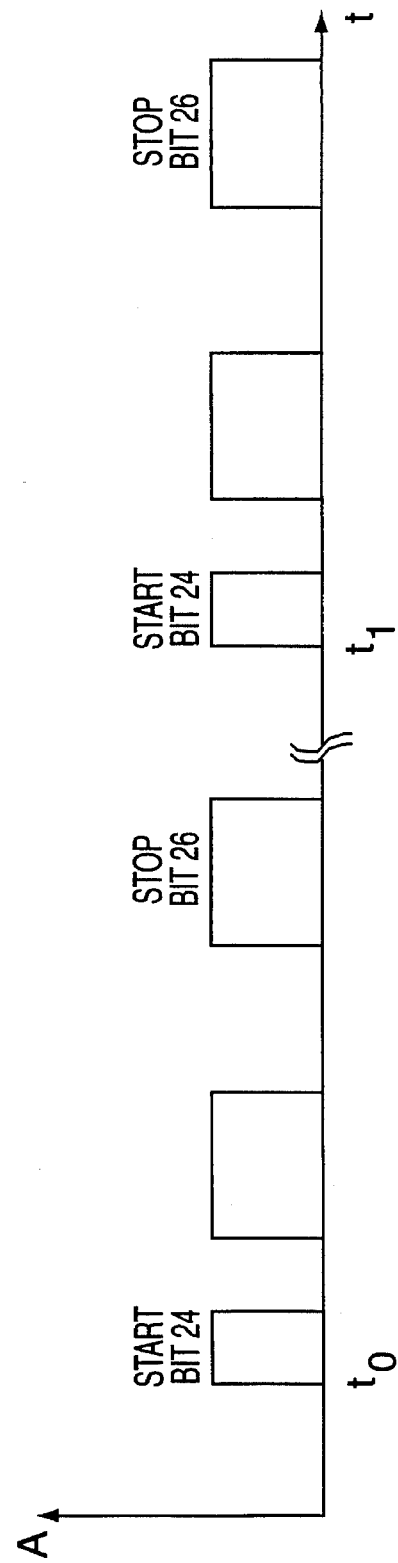
FIG. 3 is a signal transmission through the control signal line for activating a module.

FIG. 3 shows the signal path in the control signal line. If a module was newly activated then this module feeds its identification K through the control signal line to point in time t. Thereby, the identification transmission is initiated by a start bit 24 and finished by a stop bit 26. The identification is binary coded and transmitted between these two bits. All other modules of the subscriber's unit 10 receive this identification K. Thus, for inactive modules it is signalled that they cannot transmit their own identification K through the control signal line; for the hitherto activated module this means to free bus 20. As soon as the hitherto active module does not require bus 20 the received identification K is again issued on the control signal line at the point in time t and its control unit is inactivated. The module with this identification K (which called the bus 20) does then activate its control unit.

If an additional module is connected to bus 20, this module transmits a special code word through the control signal line to the activated control unit. Thus information is transmitted to the activated control unit that a new identification has been distributed and by this code word the type of communication is determined which can be processed by the new module. For example, for a wire connected telephone and a cordless telephone the same code word is required, while a different code word is required for a telefax unit. The just activated control unit then transmits a new identification K to the new module which has not yet been used. Such an identification K consists of two parts, a first part which is different for each module connected with the subscriber's unit so as to select a single module and a second part which states the type of communication which can be processed by the module. Hence in view of the storage of identification K of a module, it is also known for which type of information coming over the telecommunication network such a module is suitable. The new identification K is fed through the control signal line to the new module and stored in the new module. This identification K is used, on the one hand, to select a specific module, but also contains the initial address of the memory which contains the control program of the module. In view of the different identifications K of the modules it is assured that not a plurality of control programs have an identical address range. Furthermore, it is also possible to modularly arrange the control program of the subscriber's unit 10 which is composed of the control programs of the modules. The memory for the control programs can be separated into ranges, so that a memory range is identified by the identification K. By way of example, an identification K of 3 would correspond to an initial address of the control program of the module or, for example, 3000. In view of the fact that all modules which are connected to bus 20 already have stored their associated identifications K in their memory, each model can access any other model.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

We claim:

1. A modular subscriber device connected to a telecommunication network, wherein said modular subscriber device includes modules connected to a bus by plug connections, wherein said bus is provided with lines for signals of the telecommunication network, for data, for addresses, for control signals and for voltage supply, each of said modules has a specified function, wherein each said module is provided with a memory containing a module specific control program and a list with identifications of all said modules connected to said bus, that by said identification of one of said modules the initial address of said memory for said module specified control program is simultaneously defined, that by activating of operating elements by the user one of said modules is selected, whose control unit takes over control for said bus, and that modules which are not selected carry out functions which do not access said bus.

2. The modular subscriber device of claim 1 wherein plugs and sockets are provided on opposite faces of said modules, so that modules can be connected together without any lateral intermediary space and that at least the front and upper face of the modules form a plane face or that for connecting of two modules a cable is used, so that modules can be placed remote from the modular subscriber's device.

3. The modular subscriber device of claim 1 wherein an identification is assigned to each module by an activated control device during its operation on said bus, wherein no other module has a same identification when connected to said bus.

4. The modular subscriber device of claim 1 wherein for a data exchange of all modules being connected by said bus, the control unit of a newly activated second module by the user at first transmits its own identification through a control signal line of said bus, whereby control of an active first module is called, that the control unit of the active first module inactivates itself and relinquishes control over bus, in that the identification of the newly activated second module is transmitted from the first module through the control signal line, that only thereafter said newly activated second module transmits signals through said bus, that inactive modules do not emit any signals to the control signal line as soon as an identification is detected for the first time in the control signal line, and that inactive modules can again emit their identification through the control signal line, as soon as an identification detected for the second time in the control signal line.

* * * * *